(12) United States Patent
Sohn

(10) Patent No.: US 11,294,137 B2
(45) Date of Patent: Apr. 5, 2022

(54) KINEMATIC COUPLINGS FOR OPTICAL ELEMENTS

(71) Applicant: Facebook Technologies, LLC, Menlo Park, CA (US)

(72) Inventor: Alexander Sohn, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 189 days.

(21) Appl. No.: 16/455,395

(22) Filed: Jun. 27, 2019

(65) Prior Publication Data
US 2020/0409012 A1      Dec. 31, 2020

(51) Int. Cl.
*G02B 7/02*        (2021.01)
*G02B 7/00*        (2021.01)

(52) U.S. Cl.
CPC .................. *G02B 7/003* (2013.01)

(58) Field of Classification Search
CPC ...................................... G02B 7/003
USPC ........................................ 359/811
See application file for complete search history.

(56) References Cited

U.S. PATENT DOCUMENTS

| 9,001,257 B1 | 4/2015 | Tang et al. |
| 2006/0140623 A1 | 6/2006 | Yu |
| 2009/0141375 A1 | 6/2009 | Chang |
| 2014/0086533 A1* | 3/2014 | Gold ............... G02B 6/42 385/52 |
| 2014/0354856 A1 | 12/2014 | Zhou et al. |
| 2017/0003472 A1 | 1/2017 | Fu et al. |
| 2018/0067278 A1 | 3/2018 | Lipson et al. |
| 2019/0011609 A1* | 1/2019 | Lamontagne ........ G02B 3/0075 |

FOREIGN PATENT DOCUMENTS

| CN | 101377560 A | 3/2009 |
| JP | S6064316 A | 4/1985 |
| WO | 2014072818 A2 | 5/2014 |
| WO | 2015053626 A2 | 4/2015 |
| WO | 2015111703 A1 | 7/2015 |

OTHER PUBLICATIONS

International Searching Authority, Patent Cooperation Treaty, European Application No. PCT/US2020/047414, Notification Date: Oct. 28, 2020, 13 pages.
International Searching Authority, Patent Cooperation Treaty, European Application No. PCT/US2020?037084, Notification Date: Jun. 10, 2020, 10 pages.

* cited by examiner

*Primary Examiner* — James C. Jones
(74) *Attorney, Agent, or Firm* — Freestone Intellectual Property Law PLLC; Aaron J. Visbeek

(57) ABSTRACT

Aspects of an optical element are provided herein for use in an optical assembly. The optical element may include an optical substrate, an optical component (e.g., a lens), and a plurality of alignment features. The optical component is configured to receive light and is included in a middle region of the optical substrate. The alignment features are included in a periphery region on a surface of the optical substrate. The alignment features are configured to contact a corresponding plurality of alignment features included in another optical element of the optical assembly to provide a kinematic coupling between the optical element and the other optical element for aligning the optical components.

15 Claims, 6 Drawing Sheets

KINEMATIC COUPLINGS FOR OPTICAL ELEMENTS

FIELD OF DISCLOSURE

Aspects of the present disclosure relate generally to optical elements, and in particular but not exclusively, relate to alignment features for optical elements of an optical assembly.

BACKGROUND

A head mounted display (HMD) is a display device, typically worn on the head of a user. HMDs may be used in a variety of applications, such as gaming, aviation, engineering, medicine, entertainment and so on to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

The accuracy of the various optical elements included in the HMD, such as lenses, polarizers, waveplates, etc. may be dependent on the particular application. For example, some HMDs may incorporate an eye-tracking system that includes an integrated camera to track a user's eye movements. Thus, as the requirements and accuracy for the eye-tracking system increases, the accuracy required in the manufacturing and assembly of the various optical elements used by the eye-tracking system also increases.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to kinematic couplings for optical elements of an optical assembly. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

Figure 1:
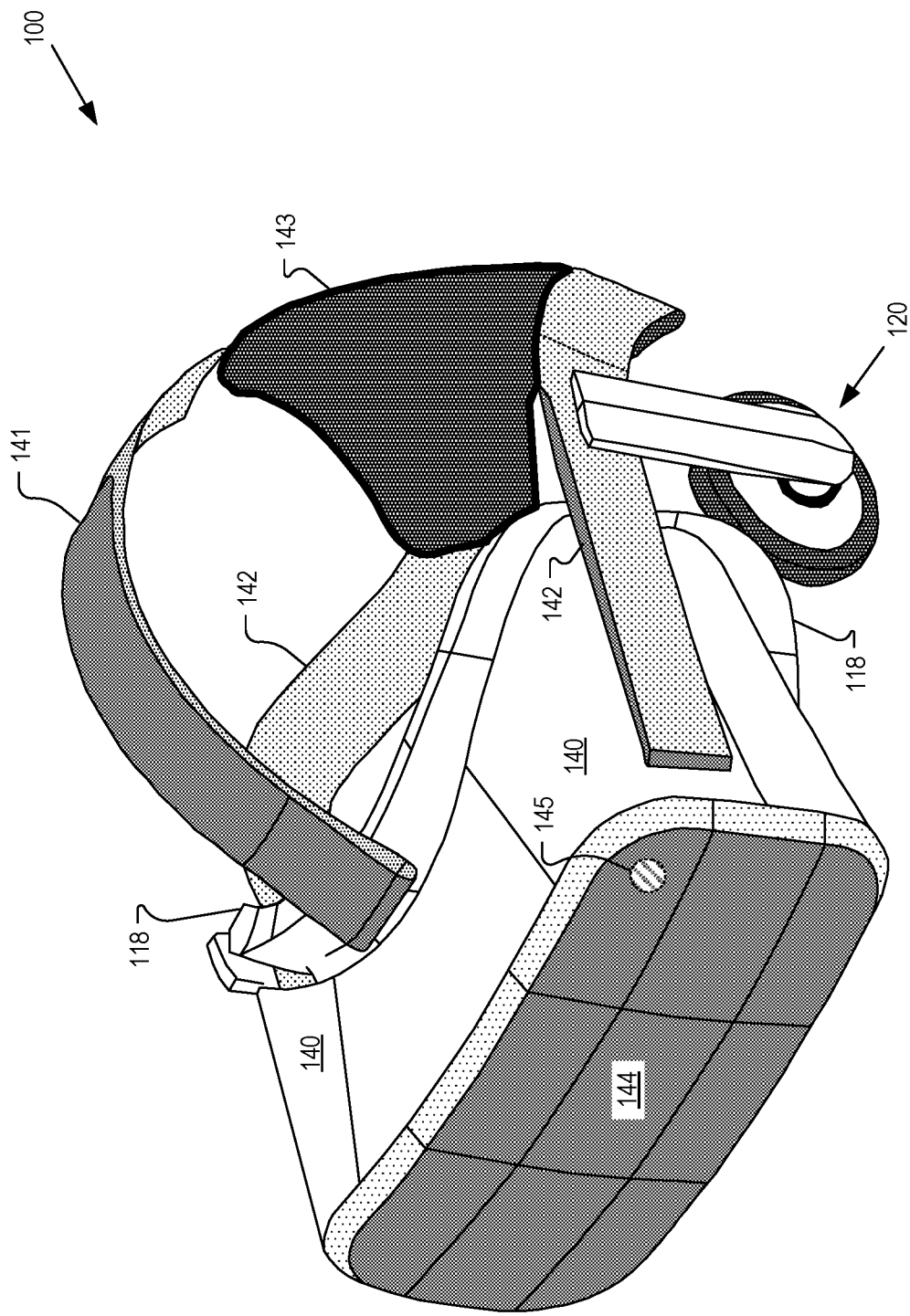
FIG. 1 illustrates a head mounted display (HMD), in accordance with aspects of the present disclosure.

FIG. 1 illustrates an HMD 100, in accordance with aspects of the present disclosure. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

Viewing structure 140 may include a display system having one or more electronic displays for directing light to the eye(s) of a user of HMD 100. The display system may include one or more of an LCD, an organic light emitting diode (OLED) display, or micro-LED display for emitting light (e.g., content, images, video, etc.) to a user of HMD 100.

In some examples, an electronic component 145 may be included in viewing structure 140. In some aspects, the electronic component 145 is a camera or image sensor for capturing image(s) of an eye of a user of HMD 100 for eye-tracking operations. In other aspects, the electronic component 145 is a Simultaneous Localization and Mapping (SLAM) sensor, such as an optical sensor, rangefinder, LiDAR sensor, sonar sensor, etc., for mapping the user and/or environment surrounding the HMD 100. In other examples, electronic component 145 may be a laser or other light-emitting device.

In some aspects, the electronic component 145 may include one or more small-diameter optical components, such as a lens, a polarizer, a waveguide, reflector, a waveplate, etc. In some aspects, a "small-diameter" optical component refers to an optical component having a diameter (e.g., aperture) that is 3 millimeters or less. As mentioned above, as the requirements and accuracy for the various systems (e.g., eye-tracking system or SLAM system) of an HMD increases, so too does the accuracy required in the manufacturing and assembly of the various small-diameter optical components.

Conventional optical component assembly techniques include fitting various optical components into a barrel or housing which in turn provides the alignment of the various optical components with respect to one another and with respect to the electronic component. However, conventional housings often include a minimum clearance requirement in order to effectively insert the optical components within the housing without interference that could distort the components. For example, some conventional housings require a minimum internal clearance of 5 microns between the housing and the optical component. In some examples, the minimum clearance requirement of conventional housings limits the accuracy with which the optical components may be aligned.

Accordingly, aspects of the present disclosure provide an optical element that is a monolithic structure that includes both the optical component (e.g., a lens) as well as a plurality of alignment features formed on a surface of the optical element. The alignment features are configured to contact a corresponding set of alignment features included in another optical element to provide a kinematic coupling between the optical elements and to provide precise optical alignment of their respective optical components. In some aspects, the kinematic coupling is designed to provide a reproducible and precise coupling between the optical elements. The design of the kinematic coupling may conform to the principles of "exact constraint design". In some examples, the kinematic coupling eliminates overconstraint of the optical elements within the housing and may also be insensitive to thermal expansion. That is, as the housing and/or optical elements themselves expand or contract due to thermal variances, the kinematic coupling may maintain a constant centration of the optical components. In some aspects, the kinematic couplings, as provided herein, may allow for sub-micron alignment of the optical components.

Figure 2:
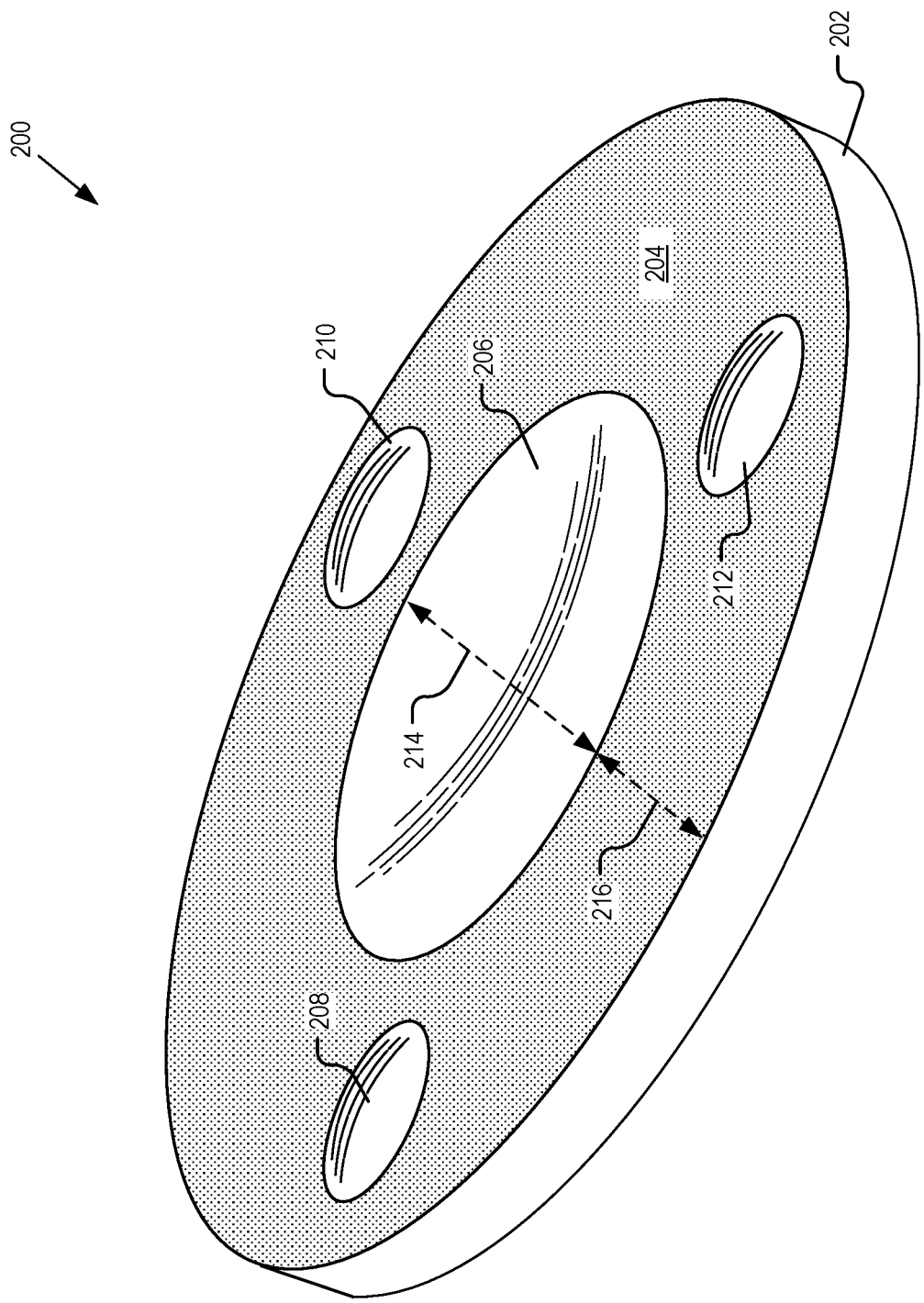
FIG. 2 illustrates an example optical element, in accordance with aspects of the present disclosure.

FIG. 2 illustrates an example optical element 200, in accordance with aspects of the present disclosure. Optical element 200 is one possible optical element for use with the electronic component 145 of FIG. 1. The illustrated example of optical element 200 is shown as including an optical substrate 202, a surface 204, an optical component 206, and alignment features 208-212. Also shown in FIG. 2 are a middle region 214 and a periphery region 216 of the optical substrate 202.

In some examples, optical element 200 is a monolithic structure that includes both the optical component 206 and several alignment features 208-212. The optical element 200 may be formed from a solid optical substrate 202, such as plastic, glass, poly-methyl methacrylate (PMMA), or other acrylic. The optical substrate 202 may be cut or ground to a desired shape of the optical element 200. In addition, the optical substrate 202 may be machined to form the optical surface of the optical component 206. The machining of the optical substrate 202 may also include simultaneously forming the alignment features 208-212. Thus, in some examples, the alignment features 208-212 are formed from the same optical substrate 202 as that of the optical component 206. In some aspects, the machining of the optical substrate 202 to form the optical component 206 and the alignment features 208-212 is done by way of fast tool servo diamond turning or multi-axis diamond milling.

In other examples, optical element 200 is formed by way of a mold that includes a shape that defines both the optical component 206 as well as the alignment features 208-212. That is, a liquid optical material may be provided (poured or injected) into the mold to simultaneously form the optical component 206 and the alignment features 208-212. In some embodiments, the liquid optical material is then cured to a solid state.

Although FIG. 2 illustrates optical element 200 as generally having a circular shape, optical element 200 may be any of a variety of shapes, such as rectangular, oblong, square, oval, etc., in accordance with the aspects provided herein.

The optical component 206 is shown as being included in a middle region 214 of the optical substrate 202. The optical component 206 may be one or more of a lens, a mirror, a diffuser, a filter, a polarizer, a prism, a window, a beam splitter, a diffractive element, or the like. In some examples, optical component 206 is configured to receive light and to direct/pass the light to a corresponding electronic component (e.g., a camera and/or image sensor). In other examples, optical component 206 is configured to receive light generated by the corresponding electronic component (e.g., a laser) and to direct/pass the light into the environment.

FIG. 2 also illustrates optical element 200 as including a plurality of alignment features 208-212 included in the periphery region 216 on the surface 204 of the optical substrate 202. Although FIG. 2 illustrates optical element 200 as including three alignment features (e.g., 208-212), any number of discrete alignment features may be included on the surface 204 of the optical substrate 202, including two or more.

Figure 3:
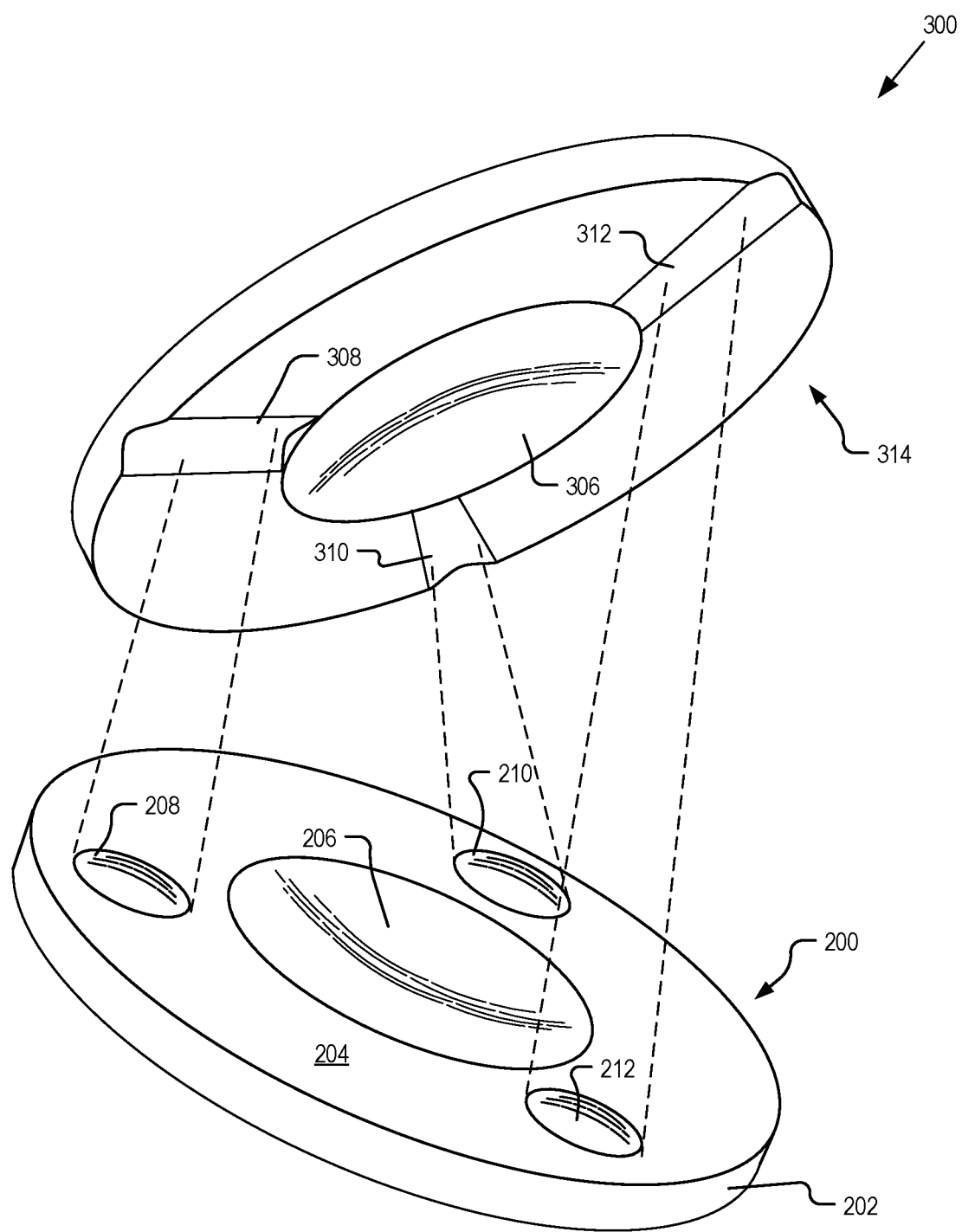
FIG. 3 illustrates an example optical assembly, in accordance with aspects of the present disclosure.

In some aspects, alignment features 208-212 are located on the surface 204 to mate with corresponding alignment features of another optical element. By way of example, FIG. 3 illustrates an exploded view of an example optical assembly 300, in accordance with aspects of the present disclosure. Optical assembly 300 is one possible optical assembly for use with the electronic component 145 of FIG. 1. The illustrated example of optical assembly 300 is shown as including optical element 200 coupled to another optical element 314.

In some examples, alignment features 208-212 are configured as bumps that extend outwardly (e.g., protrude) from the surface 204. In this example, the corresponding alignment features 308-312 of optical element 314 may be configured as corresponding grooves that mate with (i.e., contact) the bumps to form a kinematic coupling between optical elements 200 and 314. In other examples, alignment features 208-212 are configured as grooves that extend inwardly (depress into the surface 204). In this example, the corresponding alignment features 308-312 of optical element 314 may be configured as corresponding bumps that mate with the grooves to form the kinematic coupling. In yet another example, the alignment features 208-212, included on the surface 204 of optical substrate 202, are a mix of bumps and grooves (e.g., alignment feature 208 may be configured as a bump, whereas alignment features 210 and 212 may be configured as a grooves).

In some implementations, one or more of the optical components 206 and 306 may be rotationally asymmetric. That is, the rotational orientation of optical component 206 with respect to optical component 306 may affect the desired functionality of the optical assembly 300. By way of example, optical component 206 may be a polarizer, an aspherical lens, a diffractive optical element, etc. Thus, in some embodiments, one or more of the alignment features and/or a shape of the optical substrate may be configured to ensure a desired rotational orientation of the optical components. By way of example, in one aspect, the alignment features 208-212 may be keyed with the alignment features 308-312 to ensure correct rotational orientation of the optical components 206 and 306. In one aspect, one or more of the alignment features 208-212 may have a different shape and/or size as the other alignment features 208-212 included on the surface 204. In another aspect, the position of the alignment features 208-212 on the surface 204 may be rotationally asymmetric to ensure a desired rotational orientation. In yet another aspect, the optical substrate 202 may be keyed with the corresponding housing (e.g., the housing and optical substrate 202 may be D-shaped to require correct rotational orientation when inserting optical element 200 into the housing).

In some examples, the kinematic coupling provided by alignment features 208-212 and 308-312 eliminates over-constraint of the optical elements 202 and 314 within a corresponding housing (not shown in FIG. 3). In addition, the kinematic coupling provides for optical alignment of the optical component 206 with the optical component 306. In one example, optical alignment of the optical components 206 and 306 refers to an optical axis of optical component 206 being on the same axis as an optical center of optical component 306. As mentioned above, the kinematic coupling between optical element 200 and optical element 314 may maintain alignment even in response to thermal expansion/contraction of the optical elements and/or housing.

Figure 4:
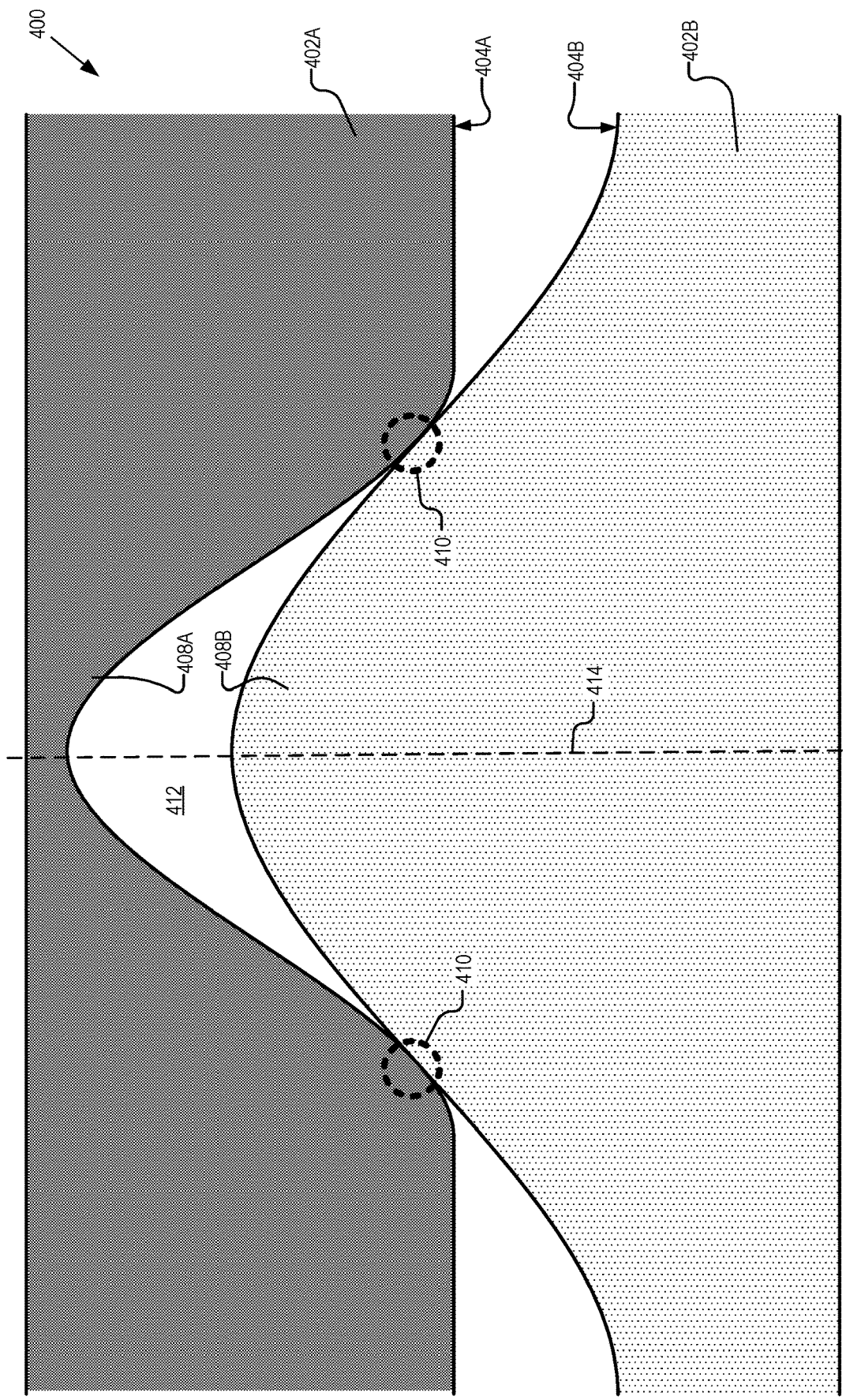
FIG. 4 illustrates an example cross-section of an alignment feature contacting another alignment feature, in accordance with aspects of the present disclosure.

In some examples, each of the alignment features 208-212 and 308-312 have a physical geometry that aides in the formation of the kinematic coupling between optical element 200 and optical element 314. For example, in one aspect, each of the alignment features 208-212 may include a curved cross-section while alignment features 308-312 includes a radially oriented linearly extruded groove. In some aspects, the curved cross-section is a sinusoidal shape. By way of example, FIG. 4 illustrates a kinematic coupling 400 by way of an example alignment feature 408A contacting another alignment feature 408B, where each of the illustrated alignment features 408A and 408B have a curved, sinusoidally-shaped cross-section. Alignment features 408A and 408B are possible examples of any of the alignment features discussed herein, including alignment features 208-212 and/or 308-312 of FIG. 2.

As shown in FIG. 4, the alignment feature 408A (configured as a groove) is included on the surface 404A of optical substrate 402A (e.g., of a first optical element), whereas alignment feature 408B (configured as a bump) is included on the surface 404B of an optical substrate 402B (e.g., of a second optical element). FIG. 4 further illustrates region 410, which represents a region where alignment feature 408A physically contacts the alignment feature 408B. In some aspects, the regions 410 are located at a maximum slope of the sinusoidal shape of the alignment feature 408B (when configured as a bump). As shown in FIG. 4, in some implementations, contact between alignment feature 408A and alignment feature 408B may result in an airgap 412 between the alignment features.

In some examples, the sinusoidal shapes of the alignment features 408A and/or 408B are based on a cosine function. By way of example, the sinusoidal shape of alignment feature 408A may be based on:

$$y = A_g \cos(\pi T_g x), \quad [\text{EQ. 1}]$$

where $A_g$ is the amplitude and $T_g$ is the period of the function that dictates the sinusoidal shape of an alignment feature configured as a groove. Similarly, the sinusoidal shape of alignment feature 408B may be based on:

$$y = A_b \cos(\pi T_b x), \quad [\text{EQ. 2}]$$

where $A_b$ is the amplitude and $T_b$ is the period of the function that dictates the sinusoidal shape of an alignment feature configured as a bump. In the illustrated example, the curved shape of the cross-section of alignment feature 408A is different from the curved shape of the cross-section of alignment feature 408B. In some examples, the shape of the cross-sections of corresponding alignment features is different such that, when assembled, the corresponding alignment features only make physical contact at regions 410 (e.g., alignment feature 408A only contacts alignment feature 408B at region 410). Thus, in some aspects, the cosine function (e.g., EQ. 1) that dictates the shape of alignment feature 408A is different from the cosine function (e.g., EQ. 2) that dictates the shape of alignment feature 408B. In some examples, the amplitude of EQ. 1 is different from the amplitude of EQ. 2 (i.e., $A_g \neq A_b$). In other examples, the period of EQ. 1 is different from period of EQ. 2 (i.e., $T_g \neq T_b$). In yet another example, both amplitude and period of EQ. 1 are different from the corresponding amplitude and period of EQ. 2.

In some embodiments, alignment feature 408A is a linearly extruded groove, while alignment feature 408B is rotationally symmetric about axis 414. In other embodiments, the alignment features 408A and 408B are rotationally asymmetric about axis 414 to aide in rotationally orienting their corresponding optical components.

Figure 5:
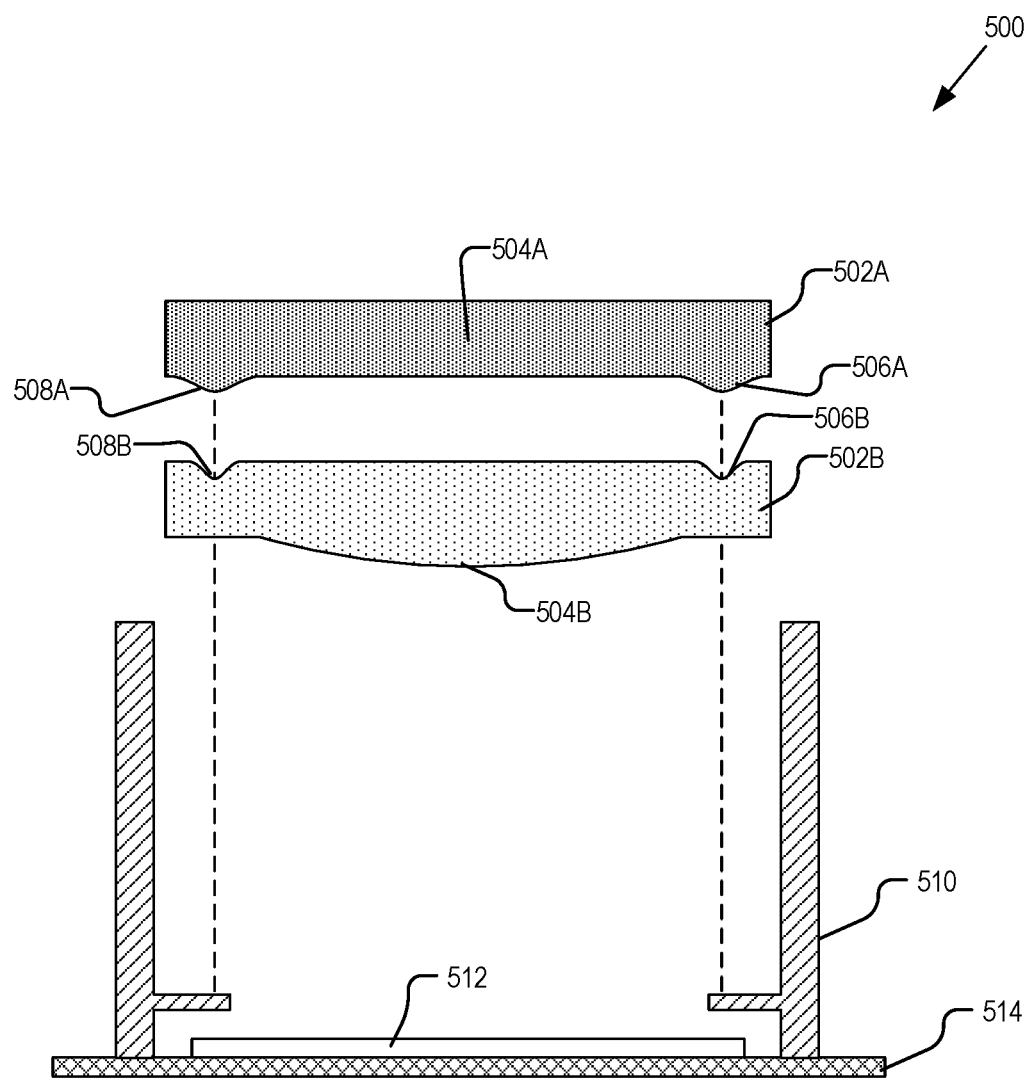
FIG. 5 illustrates an example optical assembly that includes a housing and an electronic component, in accordance with aspects of the present disclosure.

FIG. 5 is an exploded view of an example optical assembly 500 that includes a housing 510 and an electronic component 512, in accordance with aspects of the present disclosure. Optical assembly 500, including electronic component 512, is one possible example of electronic component 145 of FIG. 1. The illustrated example of optical assembly 500 is shown in FIG. 5 as including a first optical element 502A, a second optical element 502B, a housing 510, an electronic component 512, and a printed circuit board (PCB) 514. The first optical element 502A is shown as including alignment features 506A and 508A, and an optical component 504A. The second optical element 502B is shown as including alignment features 506B and 508B, and an optical component 504B.

In some implementations, electronic component 512 is an image sensor, where optical component 504B is configured as a lens to direct light to the image sensor. As shown in FIG. 5, the alignment feature 506A of the first optical element 502A is configured to physically contact with corresponding alignment feature 506B of the second optical element 502B. Similarly, alignment feature 508A is configured to physically contact with corresponding alignment feature 508B. As mentioned above, the alignment features 506A, 508A, 506B, and 508B are also configured to provide a kinematic coupling between the first optical element 502A and the second optical element 502B to optically align the optical component 504A with the optical component 504B. In some implementations, the housing 510 is configured to contain the first and second optical elements 502A/502B. The housing 510 may include an internal dimension larger than that of the optical elements to provide a "loose-fit" of the optical elements during installation and to bring the alignment features into approximate position to allow them to seat in their correct positions. After inserting the optical elements 502A/502B within housing 510, the alignment features 506A, 508A, 506B, and 508B may provide the final position of the optical elements with respect to one another.

Although FIG. 5 illustrates an optical assembly 500 that include two optical elements 502A and 502B, the optical assembly 500 may include any number of optical elements including two or more. For example, FIG. 6 illustrates an optical assembly 600 that includes three optical elements 602A, 602B, and 602C.

Optical assembly 600, including electronic component 512, is one possible example of electronic component 145 of FIG. 1. The illustrated example of optical assembly 600 is shown in FIG. 6 as including a first optical element 602A, a second optical element 602B, a third optical element 602C, housing 510, electronic component 512, and PCB 514. The first optical element 602A is shown as including alignment features 604A and 606A. The second optical element 602B is shown as including alignment features 604B and 606B on a top surface 612 (i.e., facing the first optical element 602A). The second optical element 602B is shown as also including alignment features 608B and 610B on a bottom surface 614 (i.e., facing the third optical element 602C). The third optical element 602C is shown as including alignment features 608C and 610C.

Figure 6:
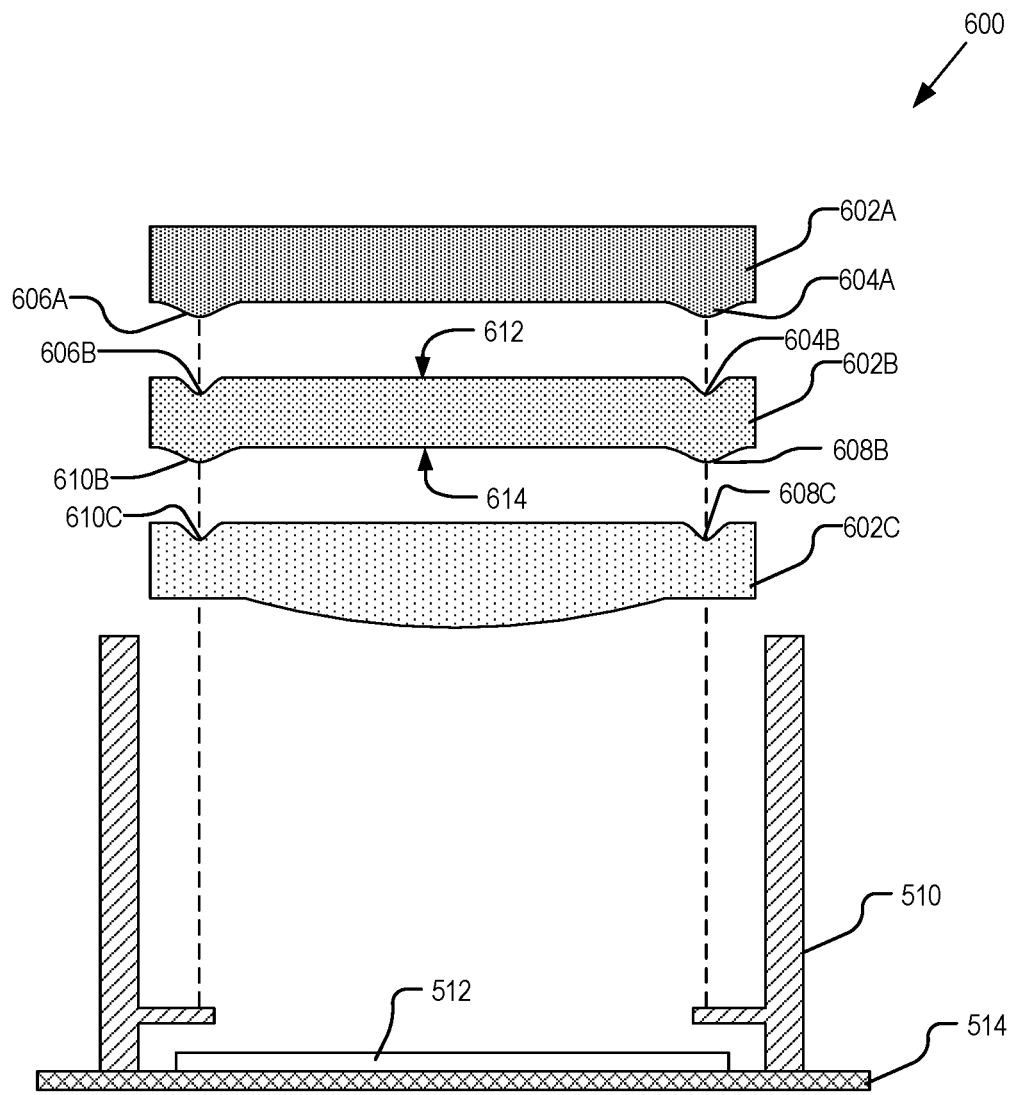
FIG. 6 illustrates an example optical assembly with an optical element that includes alignment features on both a top and bottom surfaces of the optical element, in accordance with aspects of the present disclosure.

As shown in FIG. 6, the alignment feature 604A of the first optical element 602A is configured to physically contact with corresponding alignment feature 604B of the second optical element 602B. Similarly, alignment feature 606A is configured to physically contact with corresponding alignment feature 606B. The alignment features 604A, 604B, 606A, and 606B are configured to provide a kinematic coupling between the first optical element 602A and the second optical element 602B to optically align their respective optical components.

FIG. 6 further shows an alignment feature 608B of the second optical element 602B that is configured to physically contact with corresponding alignment feature 608C of the third optical element 602C. Similarly, alignment feature 610B is configured to physically contact with corresponding alignment feature 610C. The alignment features 608B, 608C, 610B, and 610C are configured to provide a kinematic coupling between the second optical element 602B and the third optical element 602C to optically align their respective optical components.

Embodiments of the invention may include or be implemented in conjunction with the manufacture of an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical assembly for use with an electronic component, the optical assembly comprising:
   a first optical element; and
   a second optical element coupled to the first optical element, wherein the second optical element comprises:
      an optical substrate having a surface facing the first optical element;
      an optical component for receiving light, wherein the optical component is included in a middle region of the optical substrate; and
      a plurality of alignment features included in a periphery region of the optical substrate on the surface of the optical substrate, wherein the plurality of alignment features contact a corresponding plurality of alignment features included in the first optical element to provide a kinematic coupling between the first optical element and the second optical element for optically aligning the optical component of the second optical element with an optical component of the first optical element,
   wherein a first alignment feature of the first optical element comprises a first curved cross-section of a first sinusoidal shape that is based on a first cosine function and a second alignment feature of the second optical element comprises a second curved cross-section of a second sinusoidal shape that is based on a second cosine function that is different from the first cosine function, and wherein the second alignment feature of the second optical element contacts the corresponding alignment feature of the first optical element at first and second regions of maximum slope of the second sinusoidal shape, forming a gap between the first region and the second region to provide substantially minimal contact between the first alignment feature and the second alignment feature.

2. The optical assembly of claim 1, wherein an alignment feature of the plurality of alignment features comprises one of a bump or a groove formed on the surface of the optical substrate.

3. The optical assembly of claim 1, wherein:
   an amplitude and a period of the first cosine function are configured to produce the first sinusoidal shape; and
   an amplitude and a period of the second cosine function are configured to produce the second sinusoidal shape, wherein at least one of the amplitude or the period of the first cosine function are different from the corresponding amplitude or period of the second cosine function.

4. The optical assembly of claim 1, further comprising:
   a third optical element, wherein the second optical element is disposed between the first optical element and the third optical element, and wherein the second optical element further comprises:
      an additional plurality of alignment features, included in the periphery region of the optical substrate on another surface of the optical substrate facing the third optical element, wherein the additional plurality of alignment features contact a corresponding plurality of alignment features included in the third optical element to provide a kinematic coupling between the third optical element and the second optical element for optically aligning the optical component of the second optical element with an optical component of the third optical element.

5. The optical assembly of claim 1, wherein the plurality of alignment features are rotationally asymmetric to provide rotational alignment between the optical component of the second optical element and the optical component of the first optical element.

6. The optical assembly of claim 1, wherein the optical component of the first optical element and the optical component of the second optical element, each comprise at least one of: a lens, a mirror, a diffuser, a filter, a polarizer, a prism, a window, a beam splitter, or a diffraction grating.

7. The optical assembly of claim 1, wherein the electrical component comprises at least one of: an image sensor, an optical sensor, a rangefinder, a LiDAR sensor, a Simultaneous Localization and Mapping (SLAM) sensor, a laser, or a light-emitting device.

8. An optical element for use in an optical assembly, the optical element comprising:
   an optical substrate having a surface;
   an optical component for receiving light, wherein the optical component is included in a middle region of the optical substrate; and
   a plurality of alignment features, included in a periphery region of the optical substrate on the surface of the optical substrate, wherein the plurality of alignment features are configured to contact a corresponding plurality of alignment features included in another optical element of the optical assembly to provide a kinematic coupling between the optical element and the other optical element for optically aligning the optical component of the optical element with an optical component of the other optical element; and
   wherein an alignment feature of the optical element comprises a first curved cross-section of a first sinusoidal shape that is based on a first cosine function and an alignment feature of the other optical element comprises a second curved cross-section of a second sinusoidal shape that is based on a second cosine function that is different from the first cosine function and wherein the alignment feature of the optical element contacts the corresponding alignment feature of the other optical element at first and second regions of maximum slope of the second sinusoidal shape, and wherein the first region and the second region are separated from each other by a gap to provide substantially minimal contact between the alignment feature of the optical element and the corresponding alignment feature of the other optical element.

9. The optical element of claim 8, wherein an alignment feature of the plurality of alignment features comprises one of a bump or groove formed on the surface of the optical substrate.

10. An optical assembly for use with an image sensor, the optical assembly comprising:
    a housing to be coupled to the image sensor;
    a first optical element included within the housing; and
    a second optical element included within the housing and coupled to the first optical element, wherein the second optical element comprises:
       an optical substrate having a surface facing the first optical element;
       a lens for directing light to the image sensor, wherein the lens is included in a middle region of the optical substrate; and
       a plurality of alignment features, included in a periphery region of the optical substrate on the surface of the optical substrate, wherein the plurality of alignment features contact a corresponding plurality of alignment features included in the first optical element to provide a kinematic coupling between the first optical element and the second optical element for optically aligning the lens with an optical component of the first optical element; and
    wherein an alignment feature of the first optical element comprises a first curved cross-section of a first sinusoidal shape that is based on a first cosine function and an alignment feature of the second optical element comprises a second curved cross-section of a second sinusoidal shape that is based on a second cosine function that is different from the first cosine function and wherein the alignment feature of the second optical element contacts the corresponding alignment feature of the first optical element at first and second regions of maximum slope of the second sinusoidal shape to separate the first region and the second regions from each other by a gap and provide substantially minimal contact between the alignment feature of the first optical element and the alignment feature of the second optical element.

11. The optical assembly of claim 10, wherein the plurality of alignment features are rotationally asymmetric to provide rotational alignment between the lens of the second optical element and the optical component of the first optical element.

12. The optical assembly of claim 11, wherein the optical component of the first optical element comprises at least one of: a lens, a mirror, a diffuser, a filter, a polarizer, a prism, a window, a beam splitter, or a diffraction grating.

13. The optical element of claim 8, wherein:
    an amplitude and a period of the first cosine function of the optical element are configured to produce the first sinusoidal shape; and
    an amplitude and a period of the second cosine function of the other optical element are configured to produce the second sinusoidal shape, wherein at least one of the amplitude or the period of the first cosine function are different from the corresponding amplitude or period of the second cosine function.

14. The optical element of claim 8, wherein the plurality of alignment features are rotationally asymmetric to provide rotational alignment between the optical component of the optical element and the optical component of the other optical element.

15. The optical assembly of claim 8, wherein the optical component of the optical element and the optical component of the other optical element each comprise at least one of: a lens, a mirror, a diffuser, a filter, a polarizer, a prism, a window, a beam splitter, or a diffraction grating.

* * * * *